(No Model.)
C. A. SULLIVAN & P. J. SWEENEY.
LOCK FOR BICYCLES.
No. 533,680. Patented Feb. 5, 1895.
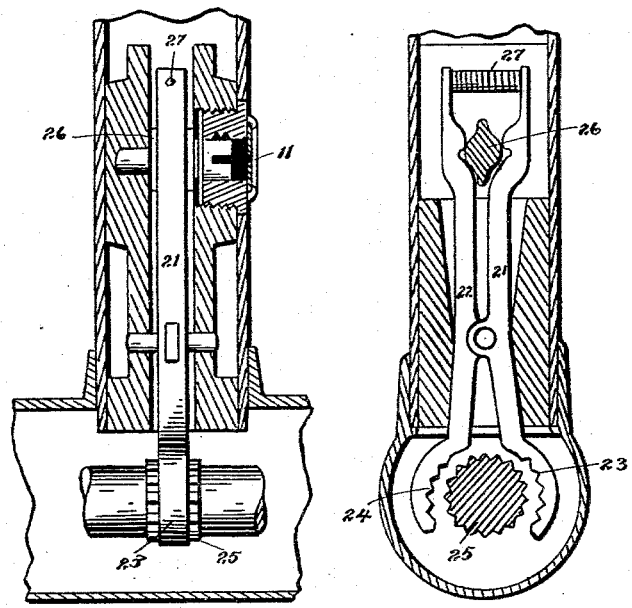
WITNESSES
R. W. Bradford
F. Clough
INVENTORS
Charles A. Sullivan
and Peter J. Sweeney
By Parker & Burton
Attorneys.

UNITED STATES PATENT OFFICE.

CHARLES A. SULLIVAN, OF WINDSOR, CANADA, AND PETER J. SWEENEY, OF DETROIT, MICHIGAN, ASSIGNORS OF ONE-THIRD TO WILLIAM J. CURRY AND ROBERT F. SUTHERLAND, OF WINDSOR, CANADA.

LOCK FOR BICYCLES.

SPECIFICATION forming part of Letters Patent No. 533,680, dated February 5, 1895.

Application filed June 6, 1894. Serial No. 513,626. (No model.)

*To all whom it may concern:*

Be it known that we, CHARLES A. SULLIVAN, residing at Windsor, in the county of Essex, Province of Ontario, Canada, and PETER J. SWEENEY, residing at Detroit, in the county of Wayne, State of Michigan, citizens of the United States, have invented a certain new and useful Improvement in Locks for Bicycles; and we declare the following to be a full, clear, and exact description of the invention, such as will enable others skilled in the art to which it pertains to make and use the same, reference being had to the accompanying drawings, which form a part of this specification.

This invention relates to bicycles, and has for its object an improved means of securing the bicycle in such a condition that one part of it is locked with respect to another part, thus preventing the unauthorized use of the bicycle or the stealing of it when the owner has temporarily left it.

The lock which we propose to employ is one which is operated both in locking and unlocking by a key, rather than one which automatically locks itself or unlocks itself, although such an automatic lock would come within the spirit of our invention, but, from the liability to accidental locking or unlocking at times when it might be desired to have it act automatically, we prefer to use a key actuated lock. We secure to one part of the bicycle, preferably to one of the frame parts, a lock, and to another part of the bicycle which moves with respect to the first mentioned, a toothed wheel about which to receive the engaging jaws of the lock, and we arrange the parts in such a manner that they add a very little weight to the bicycle, and are almost entirely concealed, so as to present no unpleasant protuberance on the frame of the bicycle at any place.

In the drawings, Figure 1 is a partial front sectional elevation showing the lock as employed to interlock between the frame and the crank shaft. Fig. 2 is a cross section of the same.

21 and 22, are two levers hinged together upon a pin which traverses the main body of the lock frame, and provided at their forward ends with toothed holding jaws 23 and 24, which engage with a toothed wheel 25 upon the movable part, in this instance shown as the crank shaft. The two levers 21 and 22 are thrown into locking engagement with the axle by turning the tumbler 26 to a position at right angles to the one shown in the drawings, when the crank shaft will be locked and the bicycle cannot be operated. When the tumbler 26 is in the position shown in Fig. 2, the jaws are held out of engagement with the toothed wheel by a spring 27.

Many other forms of interlocking devices might be suggested which would come within the spirit of our invention, which consists essentially in so placing a key actuated lock within some part of the framework that a pair of jaws may interlock with a movable part of the bicycle and prevent the usual movement necessary for the operation of the bicycle, such as the rotation of the pedals around the crank shaft or the vibratory motion of the handle post with respect to the frame in guiding the vehicle.

What we claim is—

1. In a bicycle lock, the combination of a lock frame adapted to be secured within the frame of a bicycle, a pair of levers fulcrumed within said lock frame, toothed holding jaws secured to the lower ends of said levers and a toothed wheel formed integral with the crank shaft and adapted to engage said toothed holding jaws, a tumbler engaging the upper inner ends of said levers and arranged to be operated from the outside of the frame, said tumbler adapted to throw the locking jaws into engagement with said toothed wheel, and means whereby said toothed holding jaws are held out of engagement with the toothed wheel, substantially as described.

2. In a bicycle lock, the combination of key actuated levers adapted to be secured within the frame of a bicycle, toothed holding jaws secured at one end of said levers, a spring at the opposite end adapted to hold the jaws out of locking engagement, and a toothed wheel adapted to engage with said toothed holding jaws, substantially as described.

3. In a bicycle lock, the combination of a lock frame adapted to be secured within the saddle post, two levers of the first order fulcrumed on a single pin, toothed holding jaws formed integral with the forward ends of said levers, a spring engaging between the opposite ends of the levers adapted to hold said toothed holding jaws out of locking engagement; with a toothed wheel mounted on the shaft and adapted to engage with the toothed holding jaws at the forward end of said levers, substantially as described.

In testimony whereof we sign this specification in the presence of two witnesses.

CHARLES A. SULLIVAN.
PETER J. SWEENEY.

Witnesses:
CHARLES F. BURTON,
F. CLOUGH.